E. GREENE.
RESERVE SUPPLY TANK.
APPLICATION FILED OCT. 19, 1910.
1,038,119.
Patented Sept. 10, 1912.
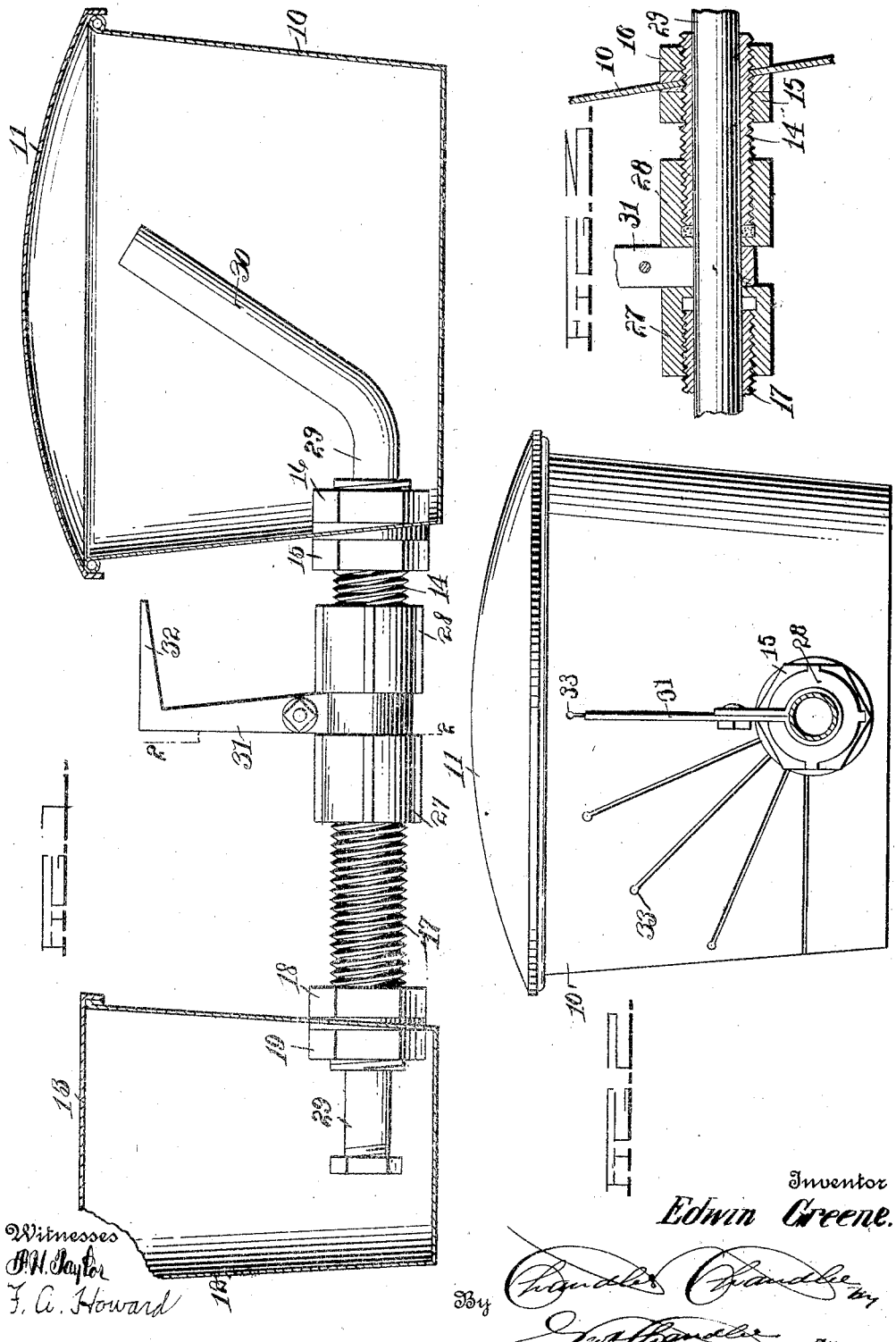
Witnesses
P. H. Taylor
F. A. Howard
Inventor
Edwin Greene.
By Chandler & Chandler
Attorneys

UNITED STATES PATENT OFFICE.

EDWIN GREENE, OF ROSWELL, NEW MEXICO.

RESERVE SUPPLY-TANK.

1,038,119.

Specification of Letters Patent. Patented Sept. 10, 1912.

Application filed October 19, 1910. Serial No. 587,913.

*To all whom it may concern:*

Be it known that I, EDWIN GREENE, a citizen of the United States, residing at Roswell, in the county of Chaves, New Mexico, have invented certain new and useful Improvements in Reserve Supply-Tanks; and I do hereby declare the following to be a full, clear, and exact description of the invention, such as will enable others skilled in the art to which it appertains to make and use the same.

This invention relates to improvements in reserve supply tanks, and has for one of its objects the provision of a supply tank adapted to automatically feed the fuel to a receiving tank.

Another object of the invention is to provide a device of this character whereby the feed device for the fuel is arranged for setting for any desired period of time to control the time which the fire shall continue.

With these and other objects in view, the invention consists in certain novel features of construction as hereinafter shown and described and then specifically pointed out in the claims; and, in the drawings illustrative of the preferred embodiment of the invention, Figure 1 is a side elevation, partly in section, of the improved device. Fig. 2 is a section on the line 2—2 of Fig. 1. Fig. 3 is a fragmentary longitudinal section of the supply pipe showing the manner in which it is passed through the stuffing boxes.

The improved device comprises in general a reservoir or receptacle for the material which is to be burned, another receptacle in which the material is burned, a supply pipe connecting the reservoir with the burner receptacle, and means whereby the supply pipe may be adjusted to control the length of time which the flow shall continue from one vessel to the other and thereby controlling the length of time which the supply shall continue, and consequently the length of time that the "burning" shall continue. The reservoir or receptacle for the supply of burning material may be of any required size and of any suitable material, and is represented conventionally at 10. The reservoir is generally constructed of relatively heavy sheet metal and provided with a swinging closure 11. The other receptacle may also be of any required size and of any suitable material, but will preferably be of heavy sheet metal of sufficient gage to withstand the heat to which it will be subjected, and is represented conventionally at 12 and provided with a closure 13 preferably hingedly connected to the vessel 12, as shown. The reservoir 10 is necessarily much larger than the receptacle 12 and the two receptacles are preferably of the same level and will generally rest upon the ground in the orchard when employed as a heater, or in the neighborhood of the plants which are to be treated when the device is employed as an insect destroyer or as a fumigator. Connected into the reservoir 10 is a nipple 14 which is secured liquid-tight to the receptacle by the usual jam nuts 15—16 and likewise provided with a suitable packing. A similar nipple 17 leads from the receptacle 12 and is secured liquid-tight therein by jam nuts 18—19. The nipples 14—17 are located preferably near the bottoms of the receptacles 10—12, as shown.

Referring more specifically to the drawings it will be seen that the nipples 14 and 17 are extended some distance outwardly from the reservoir and receptacle and are provided upon their outer ends with glands and gland nuts 28 and 27. These nipples 14 and 17 form in effect, stuffing boxes for a pipe member 29 one end of which extends into the reservoir and is provided with an upwardly directed terminal shown at 30 while the other end extends into the receptacle as shown. This pipe is rotatable in the glands and nipples and forms the supply pipe for furnishing the fuel to the receptacle.

Upon the exposed portion of the pipe between the outer ends of the nipples is an arm 31 which is clamped to the pipe in any preferred manner and which is provided at one end with a laterally directed terminal forming a pointer 32 which coacts with a scale 33 formed upon the side of the reservoir and acts to indicate the angle at which the terminal 30 of the supply pipe is disposed.

As will be readily seen as soon as the level of the liquid in the reservoir gets below the upper end of the pipe member 30 all flow of liquid between the reservoir and the receptacle will be cut off. The scale 33 consists of a series of graduations denoting various heights of liquid in the receptacle and by this means the terminal 30 of the pipe member 29 may be set at any desired height within the reservoir.

In operation the reservoir is filled with the fuel, the pointer is set at the point upon the scale indicating the depth at which the flow of liquid to the receptacle is to be cut off and as will be readily understood the fuel will flow from the reservoir to the receptacle until the level of the fluid in the reservoir has reached the open end of the terminal 30 of the pipe member 29 after which all flow will cease and no more liquid will pass to the receptacle.

The improved device is simple in construction, may be constructed from any material and of any suitable capacity, and will be found convenient and useful for the purposes required. When in use the closure 13 of the receptacle 12 will remain open to permit the free escape of the heat from the burning liquid, and may be closed to quench the fire at any time required.

The reservoir 10 and the receiver 12 are each preferably formed of a single sheet of metal folded at the corners as shown, so that no riveting or other seams are employed in the receiver or the reservoir.

What is claimed is:—

1. In a device of the character described, including a reservoir and a receiver, stuffing boxes carried by the walls of said reservoir and receiver, a supply pipe connecting the reservoir with the receiver and passing through said stuffing boxes, and an angularly extending end on said pipe within said reservoir, a pointer arm secured to said pipe intermediate the reservoir and receiver, and a scale in operative relation to said pointer arm.

2. The combination with a reservoir and a receptacle, of nipples extending through the sides of said reservoir and receptacle, glands carried by the outer ends of said nipples, a straight supply pipe extending through said glands and nipples and with its ends extending within the reservoir and receptacle, the end of said pipe extending within the reservoir being provided with a laterally directed terminal, a scale formed upon the outer wall of the reservoir, and an arm clamped to the intermediate portion of the supply pipe and extending in parallel relation to the laterally directed terminal thereof, said arm acting as an indicator in connection with the scale and also serving as a means for rotating the supply pipe within the nipples and glands.

In testimony whereof, I affix my signature, in presence of two witnesses.

EDWIN GREENE.

Witnesses:
J. M. HERVEY,
J. M. O'BRIEN.